US 6,709,237 B2

(12) United States Patent
Tiemann

(10) Patent No.: US 6,709,237 B2
(45) Date of Patent: Mar. 23, 2004

(54) TURBINE BLADE OR VANE AND PROCESS FOR PRODUCING A TURBINE BLADE OR VANE

(75) Inventor: Peter Tiemann, Witten (DE)

(73) Assignee: Siemens Aktiengesellschaft, Munich (DE)

( * ) Notice: Subject to any disclaimer, the term of this patent is extended or adjusted under 35 U.S.C. 154(b) by 56 days.

(21) Appl. No.: 10/104,624

(22) Filed: Mar. 21, 2002

(65) Prior Publication Data

US 2002/0150468 A1 Oct. 17, 2002

(30) Foreign Application Priority Data

Mar. 26, 2001 (EP) .............................. 01107385

(51) Int. Cl.⁷ .............................. F01D 5/18; F01D 9/06
(52) U.S. Cl. .................. 416/97 R; 415/115; 29/882
(58) Field of Search .................. 415/115; 416/97 R; 29/889.7, 888.025

(56) References Cited

U.S. PATENT DOCUMENTS

| | | | |
|---|---|---|---|
| 3,799,696 A | * | 3/1974 | Redman .................. 416/97 R |
| 4,286,924 A | * | 9/1981 | Gale ....................... 416/97 R |
| 4,601,638 A | * | 7/1986 | Hill et al. ................ 416/97 R |
| 5,102,299 A | * | 4/1992 | Frederick ................ 416/97 R |
| 5,243,759 A | | 9/1993 | Brown et al. |
| 5,419,039 A | | 5/1995 | Auxier et al. |

FOREIGN PATENT DOCUMENTS

| | | |
|---|---|---|
| DE | 199 63 349 | 6/2001 |
| EP | 0 978 634 | 2/2000 |
| WO | WO 99/59748 | 11/1999 |

* cited by examiner

*Primary Examiner*—Edward K. Look
*Assistant Examiner*—Igor Kershteyn

(57) ABSTRACT

The present invention relates to a turbine blade or vane (13; 14), in particular for a gas turbine (10), which has at least one chamber (18; 29; 20; 21) which can be acted on by a cooling medium and, at a rear edge (26), has a gap (25), which is delimited by two walls (28, 29), for the cooling medium to be discharged. According to the invention, at least one of the walls (28; 29) can be remachined in order to change the cross section (A) of the gap (25). In this way, the cross section (A) can be adapted to the particular boundary conditions, and therefore the consumption of cooling medium can be minimized. The invention also relates to a process for producing a turbine blade or vane (13; 14) of this type.

17 Claims, 4 Drawing Sheets

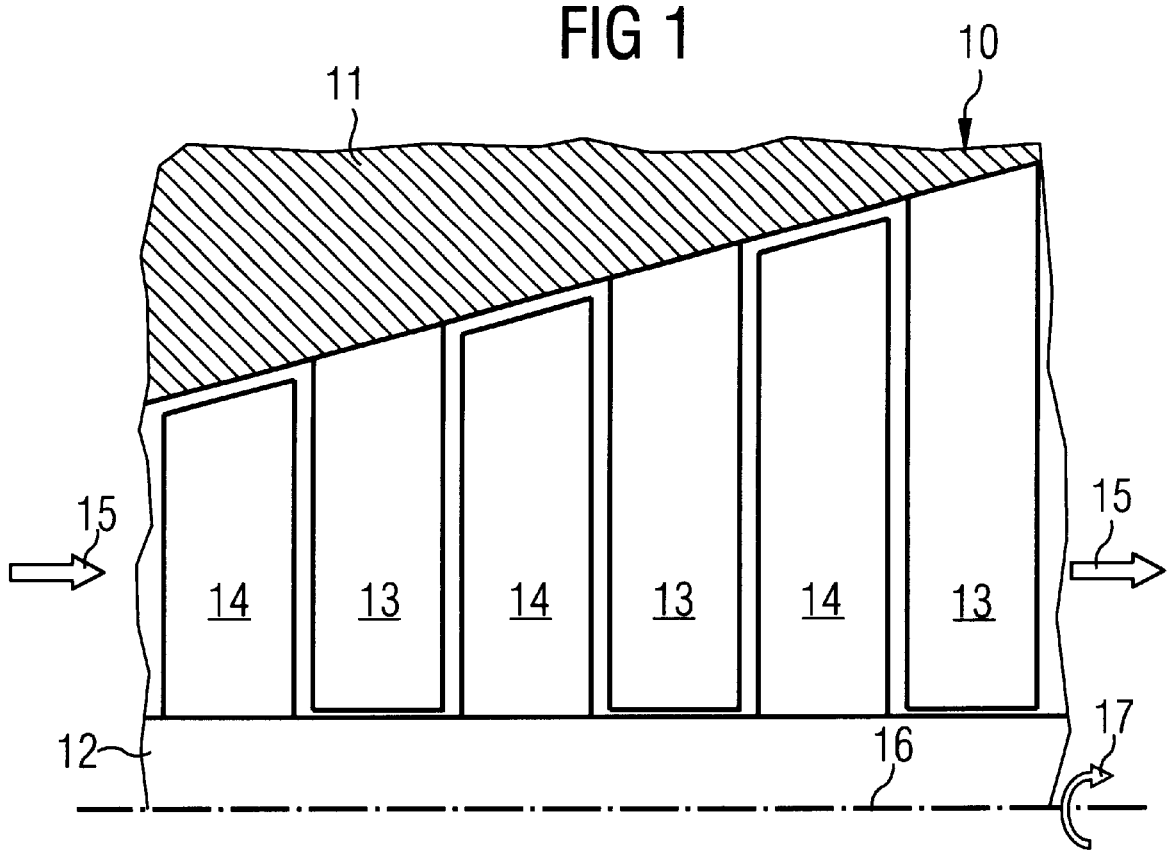
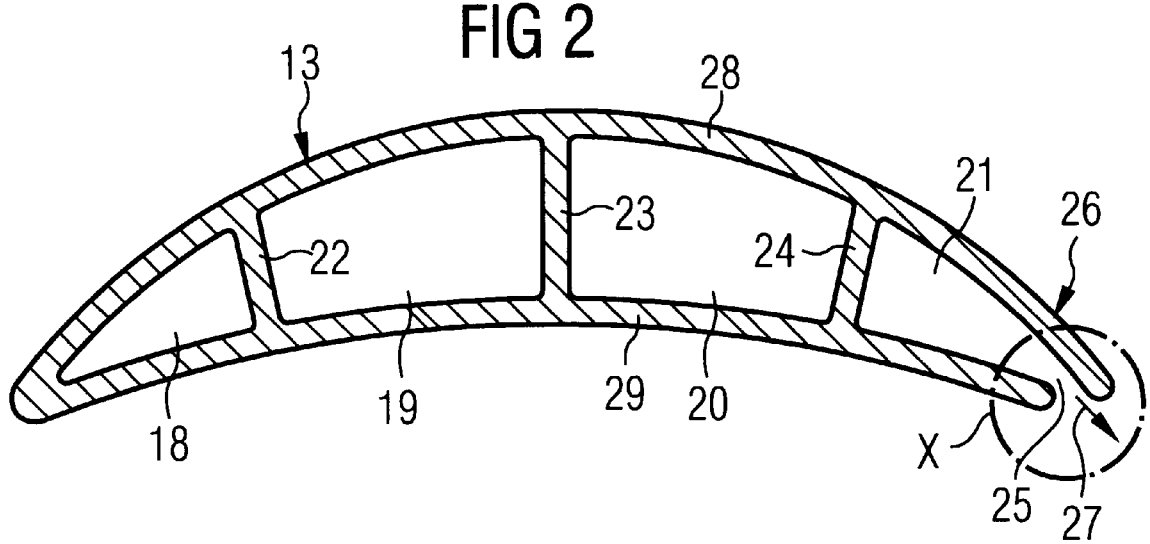

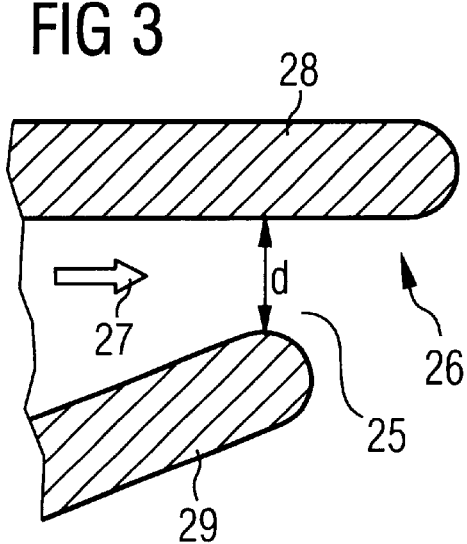
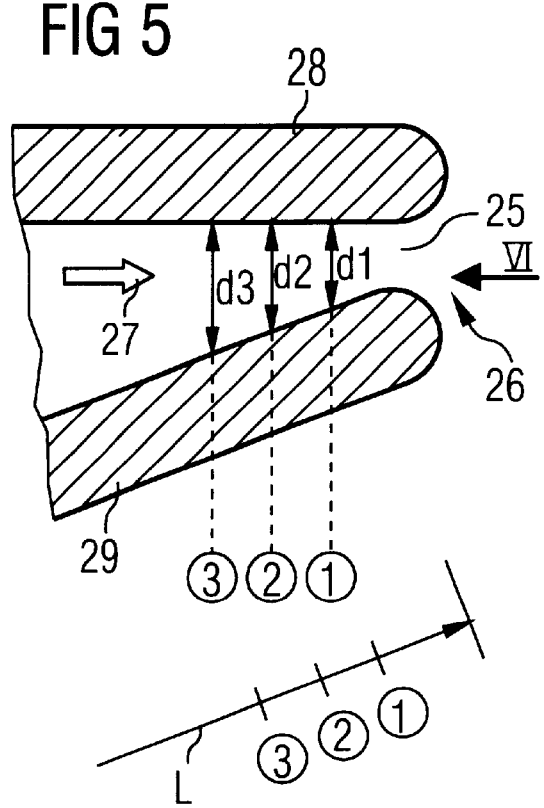
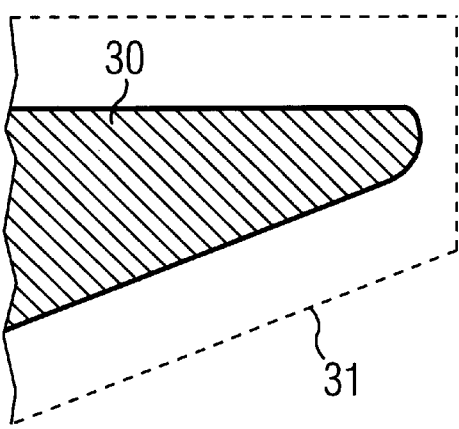
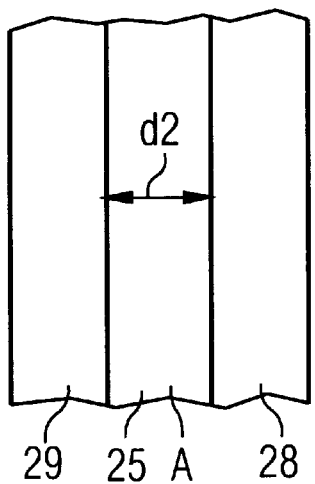

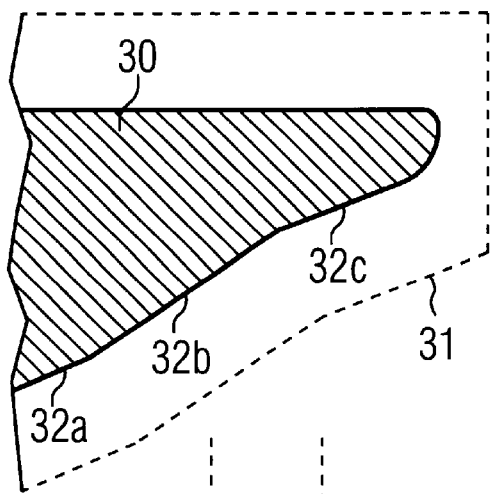
FIG 7
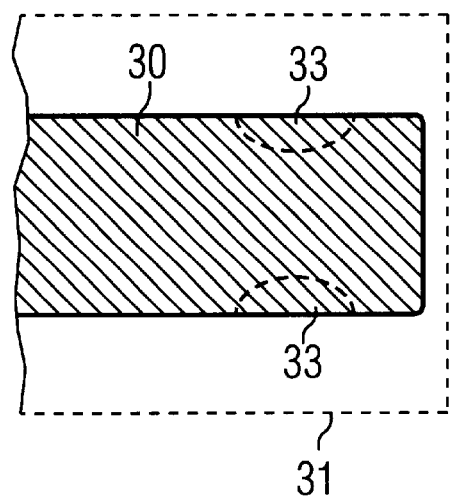
FIG 8
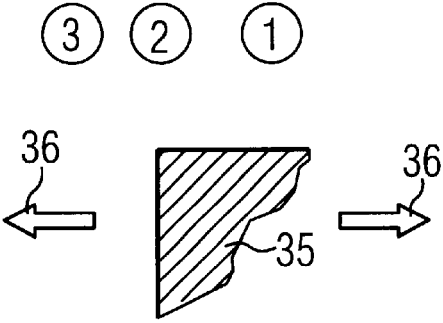
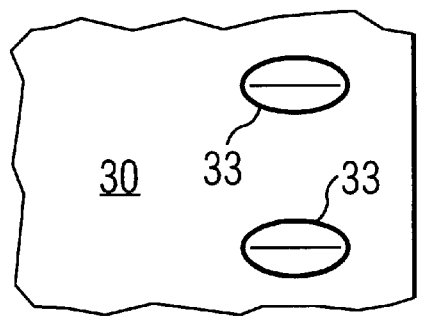
FIG 9
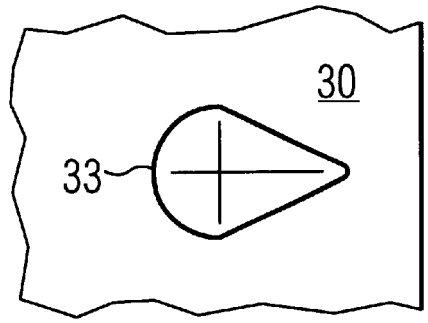
FIG 10

TURBINE BLADE OR VANE AND PROCESS FOR PRODUCING A TURBINE BLADE OR VANE

CROSS-REFERENCE TO RELATED APPLICATIONS

This application claims priority to EP/01107385.5, filed Mar. 26, 2001 under the European Patent Convention and which is incorporated by reference herein in its entirety.

FIELD OF THE INVENTION

The present invention relates to a turbine blade or vane, in particular for a gas turbine, which has at least one chamber which can be acted on by a cooling medium and, at a rear edge, has a gap, which is delimited by two walls, for the cooling medium to be discharged. It also relates to a process for producing a turbine blade or vane of this type.

BACKGROUND OF THE INVENTION

A turbine blade or vane of this type and process for its production are known, for example, from U.S. Pat. No. 5,419,039 and WO 99/59748. The turbine blades or vanes are generally produced using a casting process. To do this, in many cases one or more cores made from a ceramic material are produced and are then embedded in a wax mold. After casting with the desired material for the turbine blade or vane, the core or cores is/are removed, in particular by leaching. On account of shrinkage factors on the part of the cores, the wax, an outer core shell and the material used for the turbine blade or vane, it is impossible to achieve especially high levels of accuracy for the gap at the rear edge.

However, this gap is crucial to the way in which the cooling medium is applied to the turbine blade or vane. If the cross section of the gap is too small, the flow of cooling medium is insufficient, so that the turbine blade or vane is no longer sufficiently cooled. There is then a risk of the turbine blade or vane failing when used at high temperatures.

To ensure that the gap still has the required minimum cross section taking account of all the factors of influence, it is therefore necessary to assume a relatively high tolerance. This means that many of the turbine blades or vanes which are produced have a gap cross section which is larger than the minimum acceptable gap cross section. Accordingly, these turbine blades or vanes have a relatively high flow rate of cooling medium and are therefore cooled to an unnecessary degree. This leads to a deterioration in the efficiency, since the cooling medium in many cases has to be taken from a compressor, which is driven by the turbine, at relatively high pressure.

Therefore, it is an object of the present invention to provide a turbine blade or vane which, while being simple to produce, allows the consumption of cooling medium to be minimized. A further object of the invention is to provide a process for producing a turbine blade or vane of this type.

According to the invention, this object is achieved, in a turbine blade or vane of the type described in the introduction, by the fact that at least one of the walls can be remachined in order to change the cross section of the gap. In the process according to the invention, it is provided that the rear edge of the turbine blade or vane is remachined so as to change a length of at least one of the walls, in order to change the cross section of the gap.

Unlike with the known turbine blades or vanes and production processes, for the first time the cross section of the gap can be changed in a controlled manner. This change is achieved by changing the length at least one of the walls which delimit the gap. The result, accordingly, is a change in the cross section of the gap, so that the flow of cooling medium through the gap can be varied.

According to the invention, therefore, it is now possible to provide turbine blades or vanes which have a gap cross section which is favorable for production. This cross section is adapted to the respectively prevailing boundary conditions by remachining of the walls which delimit the gap in order to optimize the flow of cooling medium. The cross section of the gap is increased or reduced in size by remachining, depending on the way in which these walls are arranged with respect to one another. The previous need to design so as to achieve the minimum required gap cross section during production can be eliminated.

Advantageous configurations and refinements of the invention will emerge from the dependent claims.

In the blade or vane according to the invention, the cross section of the gap can advantageously be changed by changing the length of at least one of the walls. In particular, the pressure-side wall may be remachined. According to an advantageous configuration, the machining is carried out using an erosion process. The length of the walls can be measured without problems. A change with a high level of accuracy and therefore optimum setting of the cross section of the gap is possible.

According to a first advantageous configuration, at least one of the walls is provided with shoulders which project into the gap and can be changed by the remachining. The result is a corresponding change in the cross section of the gap. Alternatively, the gap may be of substantially constant thickness, which can varied by the remachining.

Therefore, in the region of the gap the walls may be arranged at an angle or substantially parallel to one another. When walls arranged parallel to one another are used, the cross section is changed using the shoulders. These shoulders have a cross section which differs in the longitudinal direction of the walls. Therefore, when the length is changed, the cross section of the shoulders changes automatically, and therefore so does the cross section of the gap.

If the walls are arranged at an angle to one another, it is possible to change the cross section of the gap even without these shoulders being required. However, it is obviously also possible for the shoulders to be provided on angled walls as well.

In the process according to the invention, after the turbine blade or vane has been produced the cross section of the gap is advantageously determined and then the remachining is carried out as a function of predeterminable boundary conditions. Therefore, it is possible for each individual turbine blade or vane to be specifically optimized. As a result, the consumption of cooling medium can be reduced considerably.

The cross section can either be measured directly, for example using optical methods, or may be measured indirectly by measuring the flow of cooling medium through the gap. It is also possible to measure the supply of cooling medium to the turbine blade or vane, this supply being dependent on the flow through the gap. Then, if necessary, remachining is carried out on the basis of the measured flow rate or the measured supply and the desired flow rate. To increase the accuracy, the cross section may be redetermined, if appropriate followed by further remachining.

DESCRIPTION OF THE DRAWINGS

The invention is explained in more detail below with reference to exemplary embodiments, which are diagrammatically illustrated in the drawing. The same reference symbols are used for similar and functionally identical components throughout the description. In the Figures:

FIG. 1 shows a diagrammatic longitudinal section through a gas turbine;

FIG. 2 shows a section through a turbine guide vane;

FIG. 3 shows an enlarged illustration of detail X from FIG. 2;

FIG. 4 diagrammatically depicts a first exemplary embodiment of production;

FIG. 5 shows a number of variants for the remachining of the turbine blade or vane;

FIG. 6 shows a view in the direction of arrow VI from FIG. 5;

FIG. 7 shows a second exemplary embodiment of production, in a view which is similar to that shown in FIG. 4;

FIG. 8 shows a third exemplary embodiment of production, in a view which is similar to that shown in FIG. 4;

FIG. 9 shows a side view of the core as shown in FIG. 8;

FIG. 10 shows a view of a core design similar to that shown in FIG. 9;

DETAILED DESCRIPTION OF THE PREFERRED EMBODIMENT

Figure 11:
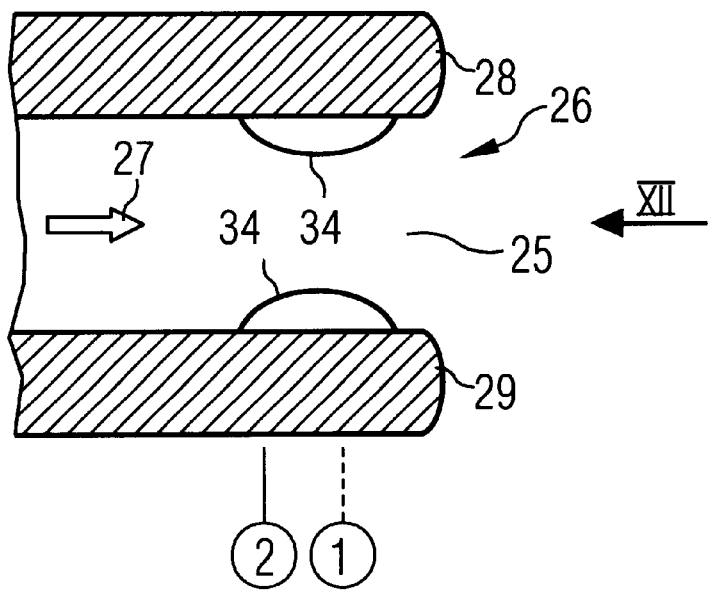
FIG. 11 illustrates a second exemplary embodiment in a similar way to FIG. 5.

FIG. 1 shows a diagrammatic longitudinal section through a gas turbine 10 having a housing 11 and a rotor 12. Rows of guide vanes 13 are provided on the housing 11, and rows of rotor blades 14 are provided on the rotor 12. A hot gas flows through the gas turbine 10 in the direction indicated by arrow 15 and causes the rotor 12 to rotate about its axis of rotation 16, in the direction indicated by arrow 17.

FIG. 2 shows a cross section through a guide vane 13. However, the present invention is not restricted to a guide vane 13, but can also be used for a rotor blade 14.

The outer sides of the guide vane 13 are formed by a suction-side wall 28 and a pressure-side wall 29. An interior space, which is defined by the walls 28, 29, is divided into a total of four chambers 18, 19, 20, 21, which are delimited by walls 22, 23, 24. To cool the guide vane 13, the chambers 18, 19, 20, 21 can be acted on by a cooling medium. The cooling medium is discharged from the chamber 21, which is arranged in the region of a rear edge 26 of the guide vane 13, via a gap 25 in the direction indicated by arrow 27.

FIG. 3 shows an enlarged view of the rear edge 26 having the gap 25. This gap 25 is delimited by the walls 28, 29 and has a thickness d. The cooling medium flows through the gap 25 in the direction indicated by arrow 27. The flow rate is dependent, inter alia, on the cross section of the gap 25.

FIGS. 4 and 5 diagrammatically depict a first exemplary embodiment of production, and a number of variants of the remachining. According to FIG. 4, an approximately wedge-shaped core 30 is provided. The die, which, together with the core 30, forms the walls 28, 29 is diagrammatically indicated by a dashed line 31.

After the material for the guide vane 13 has been introduced, cooling has taken place and the guide vane has been removed from the die, there are two walls 28, 29 which are arranged at an angle to one another. In the exemplary embodiment illustrated, the wall 29 is then remachined in such a manner that its length L is changed. Three different possibilities are diagrammatically indicated by 1, 2, 3. Different thicknesses $d_1$, $d_2$, $d_3$ of the gap 25 are established according to the length L of the wall 29. The flow of cooling medium through the gap 25 in the direction indicated by arrow 27 can therefore be optimized by the remachining and adapted to the prevailing boundary conditions.

As can be seen from FIG. 6, the gap 25 which is formed has a substantially constant thickness $d_2$ all the way along. An approximately rectangular cross section A is formed.

FIG. 7 shows another variant, using a core 30 with a plurality of sections 32a, 32b, 32c. The sections 32a, 32c are arranged parallel to one another, while section 32b is at an angle. Depending on the particular boundary conditions, the desired thickness d for the gap 25 is preset by displacing an erosion tool 35 in the direction indicated by arrow 36. On account of the different angular position of the section 32b, which is steeper than the sections 32a, 32c, it is possible to bring about a relatively substantial change in the thickness d.

FIGS. 8 to 12 illustrate another exemplary embodiment of the invention. In this case, a core 30 which is designed to be substantially rectangular in the region of the rear edge 26 is used. To adjust the cross section A of the gap 25, the core 30 is provided with recesses 33. These recesses may, as illustrated in FIG. 9, be oval or, as illustrated in FIG. 10, be composed of a semicircle and a triangle. The size, cross section and spacing of these recesses 33 are likewise predetermined as a function of the boundary conditions.

Figure 12:
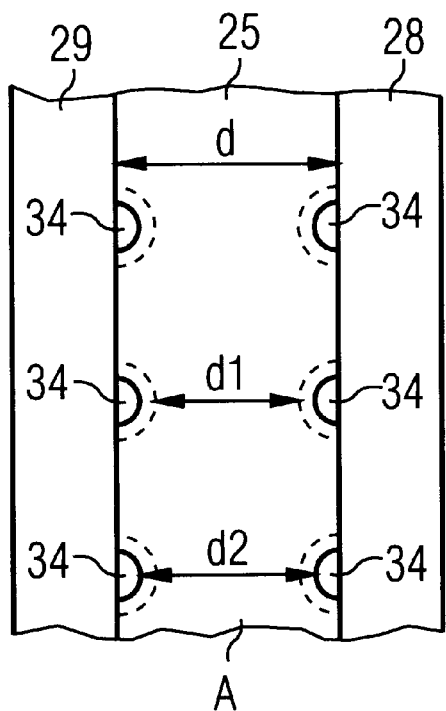
FIG. 12 shows a view in the direction of arrow XII from FIG. 10.

After casting, walls 28, 29 which are parallel to one another are produced. On account of the recesses 33, the inner sides of the walls 28, 29 are provided with shoulders 34. A different amount of the shoulders 34 remains depending on the location of remachining. Once again, the cross section A of the gap 25 is approximately rectangular, the gap being locally narrowed by the shoulders 34 to a thickness which is denoted by $d_1$ and by $d_2$, respectively. The total cross section A which is available for the cooling medium to flow through can therefore once again be varied by varying the length L of the suction-side wall 29 and, if appropriate, of the pressure-side wall 28. Different lengths L are once again diagrammatically indicated by numerals 1, 2 in FIG. 11. FIG. 12 diagrammatically depicts the gap 25 which forms, with a cross section A which is narrowed at certain locations.

Figure 13:
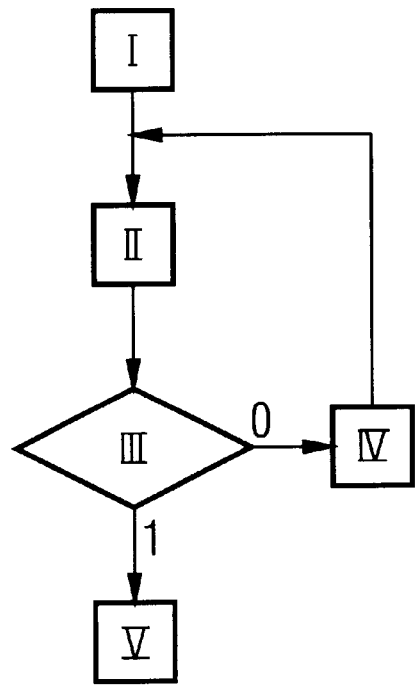
FIG. 13 shows a flow diagram of the process according to the invention.

FIG. 13 shows a flow diagram for the process according to the invention. First of all, in step I, the basic shape of the turbine blade or vane 13, 14 is defined and produced. After removal from the die, in step II the cross section A of the gap 25 is recorded. In step III, it is checked whether this cross section A is suitable for the respective boundary conditions. If not, remachining takes place in step IV, as indicated by branch 0, followed by further recording and checking. As soon as the cross section A is suitable, the remachining is ended in step V, in accordance with branch 1.

The cross section A of the gap 25 can in this case be measured directly, for example by suitable optical methods. Then, on the basis of physical principles, the flow rate of cooling medium under the predetermined boundary conditions is calculated. Depending on the result of the calculation, it is decided whether remachining is required in accordance with step IV.

Alternatively, the cooling medium can be applied to the turbine blade or vane 13, 14. Then, the flow rate of cooling medium through the gap 25 or the supply of cooling medium to the turbine blade or vane 13, 14 is measured. The result of the measurement is compared with the cooling requirements, which result from the boundary conditions. Then, if necessary, remachining in accordance with step IV is once again carried out, depending on this comparison.

The present invention allows the gap 25 at the rear edge 26 of the turbine blade or vane 13, 14 to be optimized. Therefore, the consumption of cooling medium can be minimized and consequently the overall efficiency can be increased.

What is claimed is:

1. A turbine blade or vane adapted for use in a gas turbine, comprising at least one chamber which can be acted on by a cooling medium and at a rear edge has a gap which is delimited by two walls for the cooling medium to be discharged, at least one of the walls adapted to be remachined in order to change the cross section of the gaps wherein at least one of the walls is provided with shoulders which project into the gap and can be changed by the remachining, so that the cross section of the gap can be changed.

2. The turbine blade or vane as claimed in claim 1, wherein the cross section of the gap can be changed by changing the length of at least one of the walls.

3. The turbine blade or vane as claimed in claim 1, wherein a pressure-side wall is remachined.

4. The turbine blade or vane as claimed in claim 1, wherein the gap has a substantially constant thickness which can be changed by the remachining.

5. The turbine blade or vane as claimed in claim 1, wherein the walls are arranged at angles or substantially parallel to one another at least in the region of the gap.

6. The turbine blade or vane as claimed in claim 1, wherein the at least one wall is remachined using an erosion process.

7. A process for producing a turbine blade or vane adapted for use with a gas turbine, comprising at least one chamber which can be acted on by a cooling medium and at a rear edge has a gap which is delimited by two walls for the cooling medium to be discharged, the rear edge being remachined to change a length of at least one of the walls in order to change the cross section (A) of the gap, wherein after the turbine blade or vane has been produced, the cross section of the gap is determined and then the remachining is carried Out as a function of predeterminable boundary conditions.

8. The process as claimed in claim 7, wherein the cross section is measured directly, the flow of cooling medium, through the gap is measured or the supply of cooling medium to the turbine blade or vane is measured.

9. A temperature resistant component adapted for use with a gas turbine, comprising:

at least one chamber that can be acted on by a cooling medium; and two walls that form a gap toward the rear edge of the chamber, the gap adapted to allow the cooling medium to be discharged, wherein at least one of the walls is adapted to be remachined in order to change the cross section of the gap, wherein the gap has a substantially constant thickness which can be changed by the remachining.

10. The component of claim 9, wherein the component is adapted to resistant a temperature of about 1000° C.

11. The component of claim 9, wherein the component is a turbine blade.

12. The component of claim 9, wherein the component is a turbine vane.

13. The component as claimed 9, in wherein the cross section of the gap can be changed by changing the length of at least one of the walls.

14. The component as claimed in claim 9, wherein a pressure-side wall is remachined.

15. The component as claimed in claim 9, wherein at least one of the walls is provided with shoulders which project into the gap and can be changed by the remachining, so that the cross section of the gap can be changed.

16. The component as claimed in claim 9, wherein the walls are arranged at angles or substantially parallel to one another at least in the region of the gap.

17. The component as claimed in claim 9, wherein the at least one wall is remachined using an erosion process.

* * * * *